(12) United States Patent
Huber et al.

(10) Patent No.: US 6,254,033 B1
(45) Date of Patent: Jul. 3, 2001

(54) ROLLER DRIVE UNIT

(75) Inventors: Thomas Huber, Iffeldorf; Martin Dürrwaechter, Irschenberg; Matthias Urch, Poing; Benedikt Kieser, Miesbach, all of (DE)

(73) Assignee: Telair International GmbH Obere Tiefenbachstrasse, Hausham (DE)

( * ) Notice: Subject to any disclaimer, the term of this patent is extended or adjusted under 35 U.S.C. 154(b) by 0 days.

(21) Appl. No.: 09/255,191

(22) Filed: Feb. 22, 1999

(30) Foreign Application Priority Data

Feb. 20, 1998 (DE) .............................................. 198 07 229

(51) Int. Cl.[7] ...................................................... B64D 9/00
(52) U.S. Cl. ................................... 244/137.1; 198/781.06
(58) Field of Search ............................. 244/118.1, 137.1; 198/781.05, 781.06, 782, 788; 414/529, 532

(56) References Cited

U.S. PATENT DOCUMENTS

| 2,944,297 | 7/1960 | Maynard . |
| 3,447,665 | 6/1969 | Egeland et al. . |
| 3,712,454 | 1/1973 | McKee . |
| 3,873,861 | 3/1975 | Halm . |
| 4,015,154 | 3/1977 | Tanaka et al. . |
| 4,437,027 | 3/1984 | Yamamoto et al. . |
| 4,589,542 | 5/1986 | Steadman ............................... 198/782 |
| 4,720,646 | 1/1988 | Torimoto . |
| 5,183,150 | 2/1993 | Chary et al. ........................... 198/782 |
| 5,213,201 | 5/1993 | Huber et al. ................... 244/137.1 X |

FOREIGN PATENT DOCUMENTS

| 1 956 946 | 11/1970 | (DE) . |
| 39 19 613 A1 | 12/1990 | (DE) . |
| 43 36 978 A1 | 5/1995 | (DE) . |
| 195 39 627 A1 | 5/1996 | (DE) . |
| 0 355 251 A1 | 2/1990 | (EP) . |
| 0 497 045 A1 | 8/1992 | (EP) . |
| WO 96/28719 | 9/1996 | (WO) . |

*Primary Examiner*—Robert P. Swiatek
(74) *Attorney, Agent, or Firm*—Knobbe, Martens, Olson & Bear, LLP

(57) ABSTRACT

A roller drive unit for use in the transportation of freight containers in the hold of an aircraft. The unit comprises a drive roller, which can be retracted and which can be raised into an operating position by an electric motor, for engagement with a freight container to be transported. Sensors are distributed in a ring around the drive roller so as to be able to monitor the direction of movement of a freight container approaching the roller drive unit. A controller is connected to the sensors and to the electric motor in order that the drive roller can be raised out of its lower, retracted position into an upper, operating position or conversely, according to the signals received by the controller means from the sensors.

6 Claims, 3 Drawing Sheets

ROLLER DRIVE UNIT

FIELD OF THE INVENTION

The present invention relates to a roller drive unit with sensors and a logical control circuit for use in the motor-powered raising and lowering of drive rollers of the roller drive unit.

DESCRIPTION OF THE PRIOR ART

A known loading system for loading and unloading the cargo hold of an aircraft comprises a plurality of roller drive units. Each of the roller drive units is provided with a drive roller, which when in a raised, operating position conveys a container. Sensors provided in this known loading system, however, merely signal the presence or absence of a container in the region of operation of the relevant drive roller. If there is no container over the roller drive unit, the drive roller is lowered into a resting position.

If a raised drive roller is struck by a container approaching from the side, the roller drive unit can easily be damaged. The presence of even one nonfunctional roller drive unit in a loading system can disrupt the loading process.

In view of the foregoing, the object of the present invention is to increase the reliability of operation of a roller drive unit in a loading system for loading and unloading a cargo hold, in particular in an aircraft, and hence to increase the reliability of a loading system as whole.

SUMMARY OF THE INVENTION

According to the present invention there is provided a roller drive unit for the transportation of freight containers in the hold of an aircraft comprising a drive roller rotatable about its longitudinal axis; an electric motor means linked to the drive roller in order that the drive roller can be retracted and can be raised into an operating position for engagement with a freight container to be transported by operation of the electric motor means; a plurality of sensing means disposed in a spaced relationship in a ring around the drive roller in order that a direction of movement of a freight container approaching the drive roller can be determined; and a control means operationally connected to the sensing means and to the electric motor means in order that the drive roller can be raised into the operating position and can be retracted in accordance with a signal received by the control means from the sensing means.

The invention therefore protects the drive roller of a roller drive unit, which is otherwise is largely unprotected, from hard mechanical impacts produced by the freight containers. In particular, by disposing the sensing means on the left and/or right of the drive roller with reference to the conveying direction of the drive roller, the sensing means can signal when a container is approaching the drive roller from the side. Where appropriate, the sensing means signal this to a logical control circuit that causes the drive roller to be rapidly lowered into its protected retracted position and/or rotated so that the conveying direction of the drive roller corresponds to the direction of transport of the approaching container.

A monitoring means monitors the specific electrical signals emitted by the sensing means in the case that a container is approaching and outputs them to a logical control circuit connected to the monitoring means. The control circuit determines the temporal sequence in which the sensing means are passed by the container and sends out a trigger signal when a container is approaching the sensing means near the drive roller at an unfavorable angle or from the side.

Advantageously, in one embodiment of the invention the logical control circuit in addition determines the angle, again with reference to the conveying direction of the drive roller, at which a container is approaching the roller drive unit or the drive roller. If the container is found to be moving within a predetermined range of angles such that, if no countermeasures were taken, it would strike the drive roller in a harmful way, this situation is detected in time by the control circuit with the aid of the sensing means and the control circuit sends out a trigger signal that activates the electric motor, which retracts the drive roller of the roller drive unit from the region affected by the container in time to prevent collision, and lowers the roller into a resting position.

Alternatively or in addition, the trigger signal from the control circuit can activate an actuating means such as a second electric motor which rotates the drive roller or a carrier element that carries the roller drive unit in such a way that the conveying direction of the drive roller largely coincides with the angle at which the container is approaching the roller drive unit.

The suitably positioned sensing means in combination with the logical control circuit additionally detect whether a container is over the roller drive unit or not, or the direction from which the container is moving toward the roller drive unit. As a result, the possibility that the roller drive unit might be struck from the side is excluded. If an object passes simultaneously over two individual sensing means on either side of the drive roller, the latter can be raised and actuated or remain raised and continue to operate. If the object passes over only one of these sensing means, the drive roller can remain retracted. If the two sensing means are passed over in sequence, the drive roller must be rapidly lowered and retracted or, if already retracted, must not be raised into an operating position. Preferably the drive roller is lowered into its retracted position as soon as the sensing means no longer signal the presence of a container.

The sensing means employed here preferably comprise optical sensors, such as reflection photoelectric barriers.

The invention will now be described by way of example with reference to the accompanying drawings.

DESCRIPTION OF THE PREFERRED EMBODIMENTS

Figure 1:
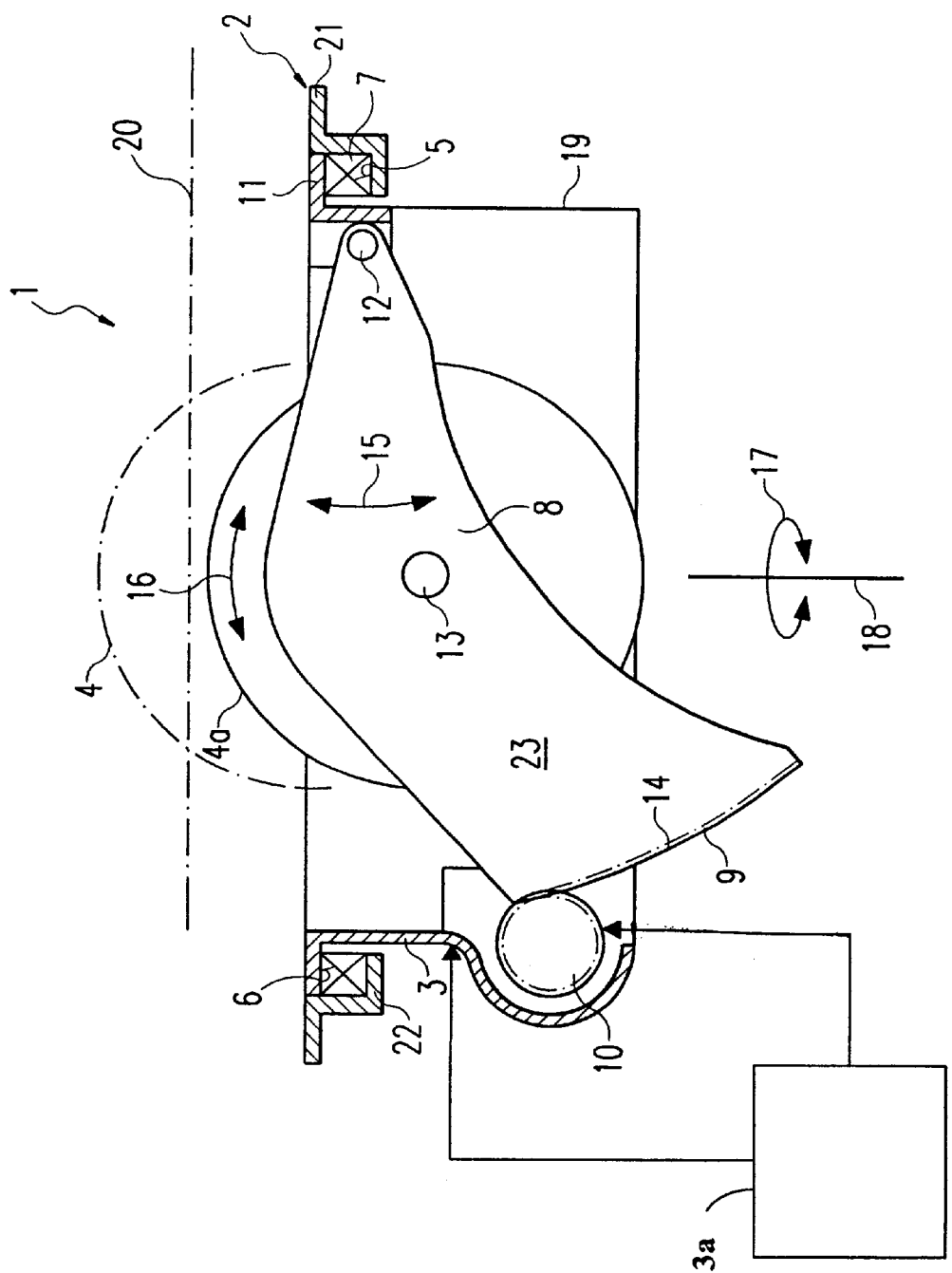
FIG. 1 is a schematic side elevation, in partial vertical section, of a roller drive unit in accordance with the invention.
Figure 2:
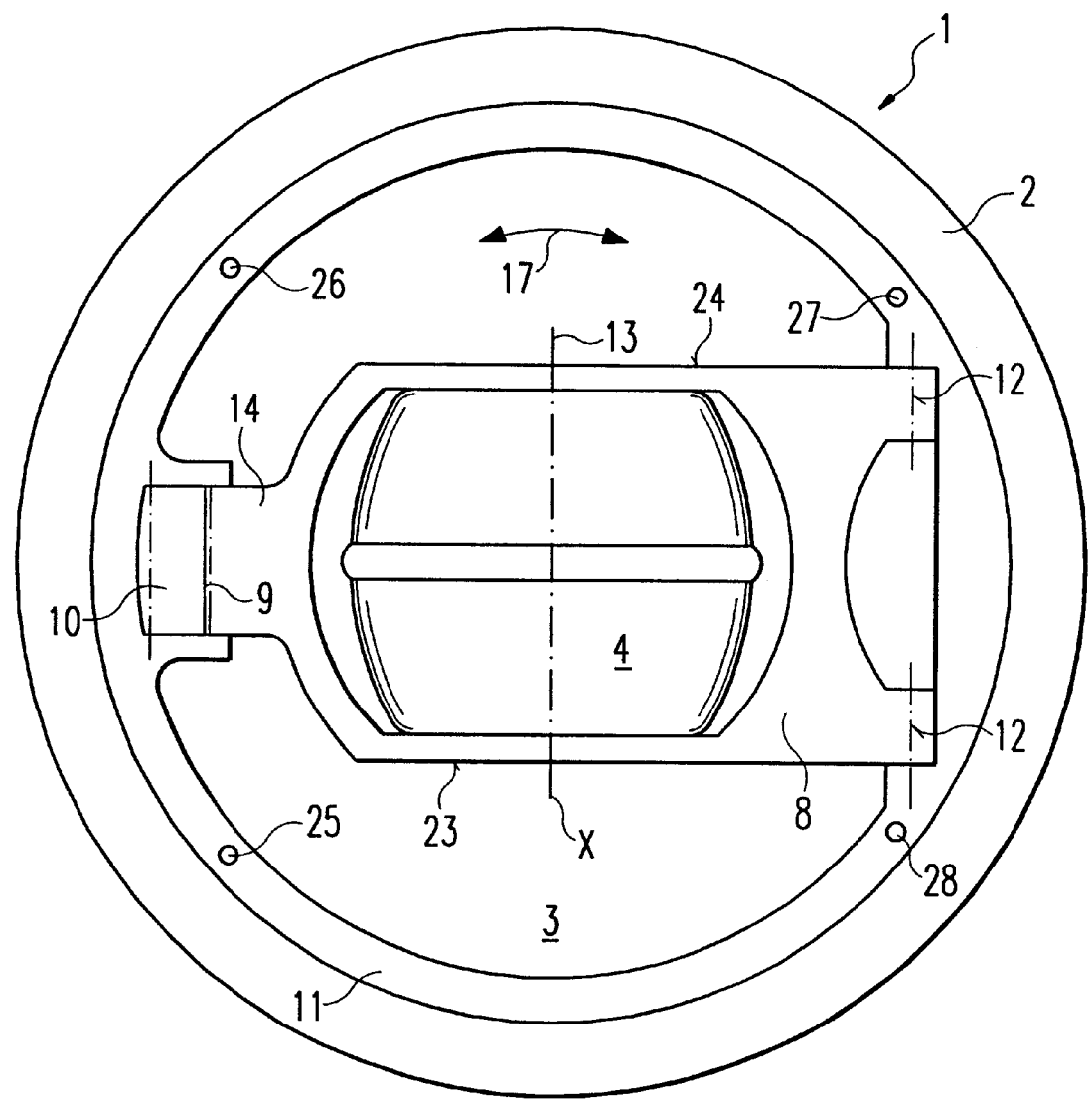
FIG. 2 is a schematic plan view of the roller drive unit shown in FIG. 1.

A roller drive unit 1 in accordance with the invention and shown in FIGS. 1 and 2 comprises an annular fixing means 2, a carrier means 3 and a drive roller 4 or 4a. For the sake of clarity, a cover for the roller drive unit which is also provided per se has been omitted from the drawings.

The annular fixing means 2 comprises an outer collar 21, by means of which the fixing means or the roller drive unit 1 can be simply mounted in a cargo hold, e.g. that of an aircraft, preferably in an opening in the floor of the cargo hold. Into the annular fixing means 2 is inserted the carrier means 3, preferably flush with the upper surface of the fixing means. For this purpose the fixing means 2 is provided with an inner collar 22, which forms a bearing surface 5 for the inserted carrier means 3. The carrier means 3, which preferably defines a cylindrical hollow body 19, is in turn provided with a flange 11, the undersurface of which forms a supporting surface 6 which rests upon the inner collar 22 of the fixing means 2, preferably by way of an annular roller or cylinder bearing 7. Accordingly, the carrier means 3 can be rotated about a vertical axis 18, through an angle in the range from 0 to 180 degrees or in the range from 0 to 90 degrees, as shown by the double-headed arrow 17 into the direction in which a freight container is to be conveyed.

For this purpose the carrier means 3 comprises a toothed rim (not shown), preferably on or in its largely cylindrical hollow body 19. The carrier means 3 is preferably controllably operated, preferably by a first driving output of a planetary gear system (not shown) driven by an electric motor 3a as previously explained, such that its rotation is possible both with a retracted drive roller 4a (resting position) and with a raised drive roller 4 (operating position).

In the rotatable carrier means 3 is provided a pivoted holder or cage 8 that can be rotated up and down, as indicated by the double-headed arrow with the reference numeral 15 in FIG. 1. At one end the pivoted holder 8 is coupled to the carrier means 3, as indicated by the reference numeral 12 in FIGS. 1 and 2. At its other end 14, which can be rotated up and down, the pivoted holder 8 is provided with a toothed edge 9. The toothed edge 9 meshes with a pinion 10, which may likewise be rotatably disposed in or on the carrier means and which is preferably controllably driven by a second driving output of the planetary gear system (not shown). When in operation, the pinion 10 acts on the toothed edge 9 so as to move the pivoted holder 8 upward into one of a plurality of operating positions for the drive roller 4 or downward into the single resting position of the drive roller 4a, dependent on its direction of rotation. When the pressure exerted by the drive roller against the bottom of a container situated above the drive roller 4 in a transport plane 20 needs to be increased, the drive roller 4 is moved by way of the drive pinion 10, the toothed edge 9 and the pivoted holder 8 so as to raise it from a first, lower operating position above the transport plane 20 into a second, higher operating position above the transport plane 20.

The pivoted holder 8 comprises two opposed, kidney-shaped side plates 23 and 24, which are joined to one another by cross-pieces at their ends. At their first ends, the plates 23 and 24 are coupled to the carrier means 3, and at their second ends, which in each case comprise the toothed edge 9, they are joined together in such a way that a gap is defined between them within which the drive roller 4 is accommodated, preferably in the middle. Transverse to the axis about which the carrier means 3 is rotated there is disposed between the two side surfaces 23 and 24 an axle or shaft (not shown) that carries the drive roller 4 on bearings, so that the drive roller 4 can be driven by a second electric motor (not shown) so as to rotate forward or backward about a longitudinal axis of rotation 13 in the directions indicated by double-headed arrow 16. Preferably, a variable, stepped gear means is interposed between this second electric motor and the drive roller 4. There is further disposed in the flange 11 a plurality of sensing means comprising sensors 25, 26, 27, 28, such as reflection photoelectric barriers, which are spaced and arranged in a ring around the drive roller 4. The distribution of the sensors 25, 26, 27 28 is symmetrical with respect to the axis of rotation X, in order that a container approaching the unit from the left in FIG. 2, i.e. perpendicular to the axis of rotation X of the drive roller 4, covers the sensors 25 and 26 substantially simultaneously. If the container comes from the right, it covers the sensors 27 and 28 simultaneously. In both cases, therefore, when the container is positioned over the roller drive unit and all four sensors 25, 26, 27, 28 are covered the drive roller can be raised and rotated in a direction determined by the sequence in which the left sensors 25, 26 and the right sensors 27, 28 were covered. If the container passes substantially simultaneously over the sensors 26 and 27, it is coming from a direction corresponding to the axis of rotation X of the drive roller 4. The same applies, of course, to the sensors 25 and 28, the lower one shown in FIG. 2. In this case the drive roller 4 ought not to be raised or, if it is already in the raised position, must quickly be lowered. It will readily be understood that from the temporal sequence in which the sensors 25–28 are passed, the precise angle of approach can be derived. As a result, the drive roller 4 or the carrier element 3 can be rotated, as indicated by arrow 17 in FIG. 2, in such a way that the direction of movement of the container coincides with the direction in which the drive roller 4 is rotating, i.e. the direction perpendicular to the axis of rotation X.

Figure 3:
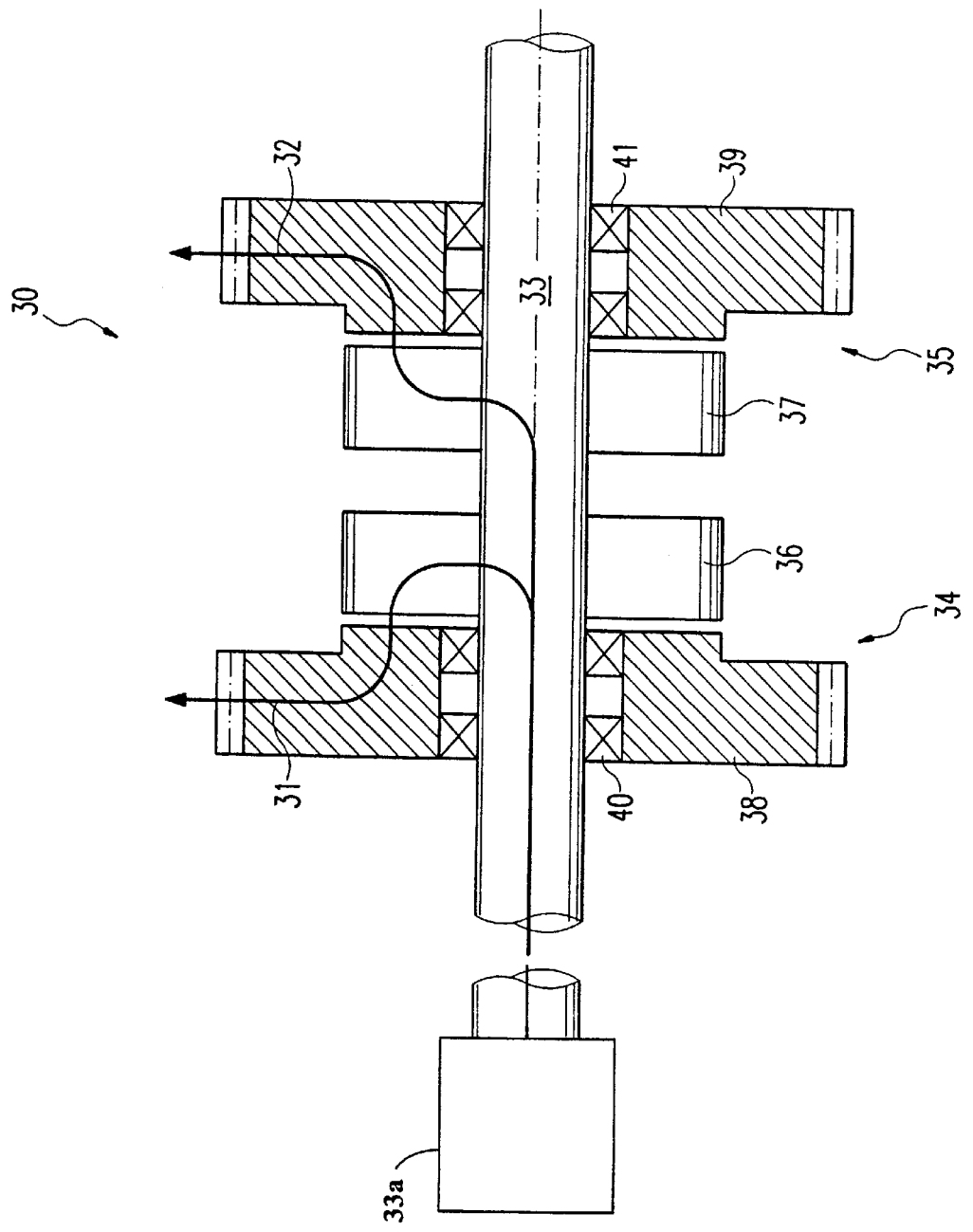
FIG. 3 is a part sectional view of a gear transmission system with two driving outputs.

As an alternative to the use of a planetary gear system, for example, another transmission system with two driving outputs can be used. An example thereof is the gearing 30 shown in FIG. 3, which comprises a first driving output 31 and a second driving output 32. On an elongated motor shaft 33 of an electric motor 33a two drive units 34 and 35 are arranged, which are rotationally movable independently of one another. The first drive unit 34 comprises a drive pinion 38, a pivot bearing 40 and a coupling 36, arranged such that the drive pinion 38 and the coupling 36 are rotatably mounted on the motor shaft 33 by way of the pivot bearing 40. Similarly, the second drive unit 35 comprises a drive pinion 39, a pivot bearing 41 and a coupling 37, arranged such that the drive pinion 39 and the coupling 37 are rotatably mounted on the motor shaft 33 by way of the pivot bearing 41. By actuating one or both of the couplings 36 and 37 a force-transmitting connection can be created between the motor shaft 33 and one or bother of the driving outputs 31 and 32, as desired. If such a transmission system is employed, for example, to drive the roller drive unit described here, it is possible, for example, to use the driving output 31 to controllably drive the carrier means 3 and the driving output 32 to controllably drive the pinion 10.

It will be evident that instead of kidney-shaped side plates 23 and 24 it is also possible to use side plates having a different shape but with the same effect.

It will also be evident from the above that the invention relates not only to a roller drive unit but also to a method of raising and lowering the drive roller of a roller drive unit in accordance with movement signals that indicate the movement of a freight container.

What is claimed is:

1. A roller drive unit for the transportation of freight containers in the hold of an aircraft comprising a drive roller rotatable about a longitudinal axis to convey a freight container;

an electric motor linked to the drive roller in order that the drive roller can be retracted and can be raised into an operating position for engagement with a freight container to be conveyed by operation of the electric motor;

a plurality of sensing means disposed in a spaced relationship in a ring around the drive roller in order that a direction of movement of a freight container approaching the drive roller can be determined; and a control means operationally connected to the sensing means and to the electric motor in order that the drive roller can be raised into the operating position and can be retracted in accordance with a signal received by the control means from the sensing means.

2. A roller drive unit as claimed in claim 1, wherein the sensing means are each spaced from the drive roller at a distance determined by a speed of operation of the electric motor in retracting the drive roller in order that the drive roller can be retracted from the operating position to prevent contact between the drive roller and a moving freight container detected by the sensing means to be approaching the drive roller.

3. A roller drive unit as claimed in claim 1, wherein the sensing means are disposed symmetrically in a ring around the drive roller with respect to the longitudinal axis of rotation of the drive roller.

4. A roller drive unit as claimed in claim 1, wherein actuating means are provided to rotate the drive roller about an axis perpendicular to its longitudinal axis of rotation in order to change a conveying direction of the drive roller, and wherein the control means is linked to said actuating means so that the drive roller is rotated in such a way that its conveying direction corresponds to the direction of movement of a moving freight container detected by the sensing means to be approaching the drive roller.

5. A roller drive unit for transporting freight containers in a hold of an aircraft comprising a drive roller rotatable about a longitudinal axis to convey a container;

an electric motor linked to the drive roller, the electric motor configured to position the drive roller in a retracted position and a raised, operating position for engagement with the container to be conveyed;

a plurality of sensors disposed in a spaced relationship in a ring around the drive roller, the sensors configured to determine a direction of movement of a freight container approaching the drive roller; and a controller operationally connected to the sensors and to the electric motor in order to raise the drive roller into the operating position and to retract the drive roller in accordance with a signal received by the controller from the sensors.

6. A method of transporting freight containers in a hold of an aircraft comprising providing a roller drive unit comprising a drive roller and being installed in the hold of the aircraft;

determining a direction of movement of the freight container approaching the drive roller with sensors disposed in a ring around the drive roller;

generating a control signal indicative of the determined direction of movement;

controlling the drive roller between a retracted position and a raised, operating position as a function of the control signal; and rotationally engaging the drive roller with the freight container in the operating position to convey the freight container.

* * * * *